United States Patent
Motta

(10) Patent No.: US 7,304,683 B2
(45) Date of Patent: *Dec. 4, 2007

(54) METHOD OF AUTOMATICALLY ADJUSTING EXPOSURE IN A SHUTTERLESS DIGITAL CAMERA

(75) Inventor: Ricardo Motta, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 904 days.

This patent is subject to a terminal disclaimer.

(21) Appl. No.: 10/783,274

(22) Filed: Feb. 20, 2004

(65) Prior Publication Data

US 2004/0165100 A1    Aug. 26, 2004

Related U.S. Application Data

(63) Continuation of application No. 09/428,877, filed on Oct. 28, 1999, now Pat. No. 6,734,913.

(51) Int. Cl.
*H04N 5/238*    (2006.01)
*H04N 9/68*    (2006.01)

(52) U.S. Cl. .................. 348/366; 348/238; 348/363

(58) Field of Classification Search ............... 348/364, 348/366, 238, 234
See application file for complete search history.

(56) References Cited

U.S. PATENT DOCUMENTS

| | | | |
|---|---|---|---|
| 4,330,797 A | 5/1982 | Yokokawa et al. | |
| 4,809,076 A | 2/1989 | Todaka et al. | |
| 4,969,045 A | 11/1990 | Haruki et al. | |
| 5,101,276 A | 3/1992 | Ohta | |
| 5,115,045 A | 5/1992 | Gillis et al. | |
| 5,150,215 A | 9/1992 | Shi | |
| 5,192,968 A | 3/1993 | Kishida et al. | |
| 5,231,514 A | 7/1993 | Nakamura | |
| 5,473,374 A | 12/1995 | Shimizu et al. | |
| 5,614,744 A | 3/1997 | Merrill | |
| 5,617,484 A | 4/1997 | Wada | |
| 5,625,716 A | 4/1997 | Borg | |
| 5,724,456 A | 3/1998 | Boyack et al. | |
| 5,751,352 A | 5/1998 | Ogawa | |
| 5,768,482 A | 6/1998 | Winter et al. | |
| 5,818,975 A | 10/1998 | Goodwin et al. | |
| 5,867,214 A | 2/1999 | Anderson et al. | |
| 5,870,505 A | 2/1999 | Wober et al. | |
| 5,881,184 A | 3/1999 | Guidash | |
| 6,741,284 B1 * | 5/2004 | Shono | 348/349 |
| 6,906,753 B1 * | 6/2005 | Matoba et al. | 348/362 |

FOREIGN PATENT DOCUMENTS

| | | |
|---|---|---|
| EP | 0393710 | 10/1990 |
| FR | 2546352 A | 11/1984 |
| JP | 6238988 | 12/1987 |
| JP | 2271784 | 11/1990 |
| JP | 6189182 | 7/1994 |
| JP | 8046860 | 2/1996 |
| JP | 10336514 | 12/1998 |

* cited by examiner

*Primary Examiner*—Lin Ye
*Assistant Examiner*—Nicholas G Giles

(57) ABSTRACT

In accordance with the present invention a shutterless single lens digital still camera includes an internal processor and auto exposure algorithm that automatically adjusts the exposure of the camera in high and low ambient lighting conditions. The auto exposure algorithm causes the camera to generate a signature of a current ambient luminance level and then in response to the signature to generate automatically an exposure setting.

4 Claims, 6 Drawing Sheets

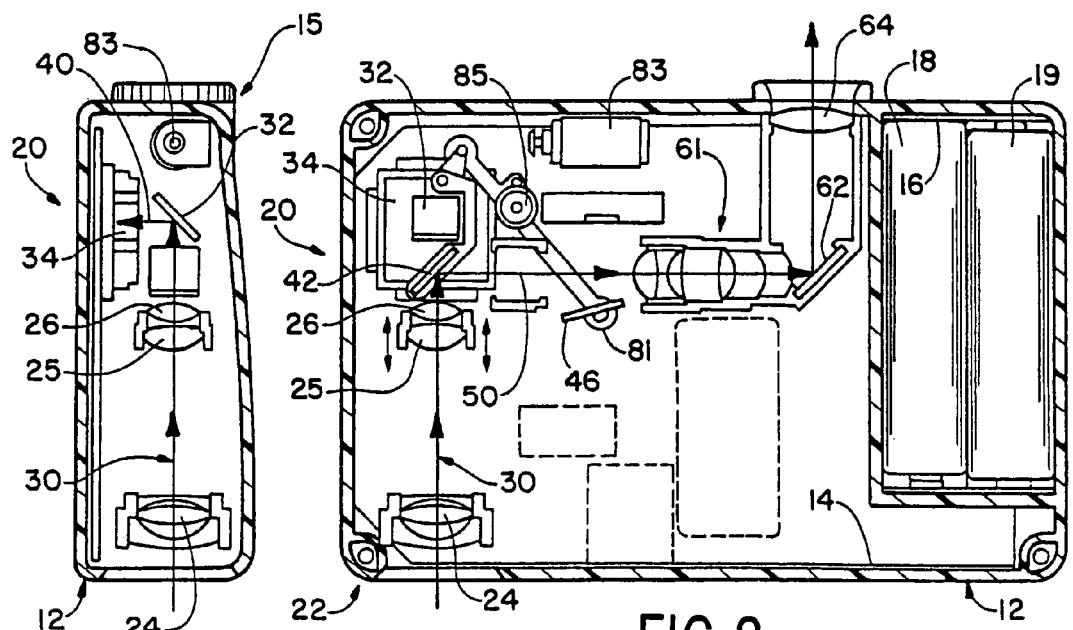
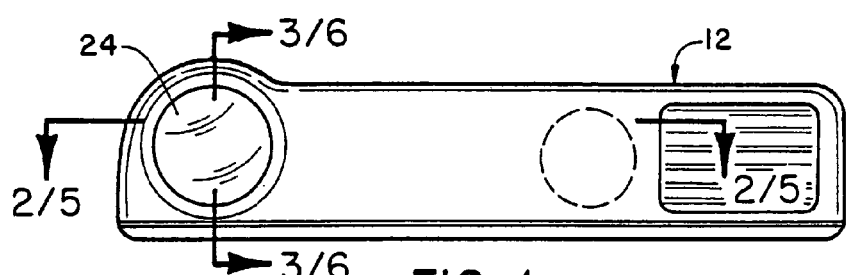
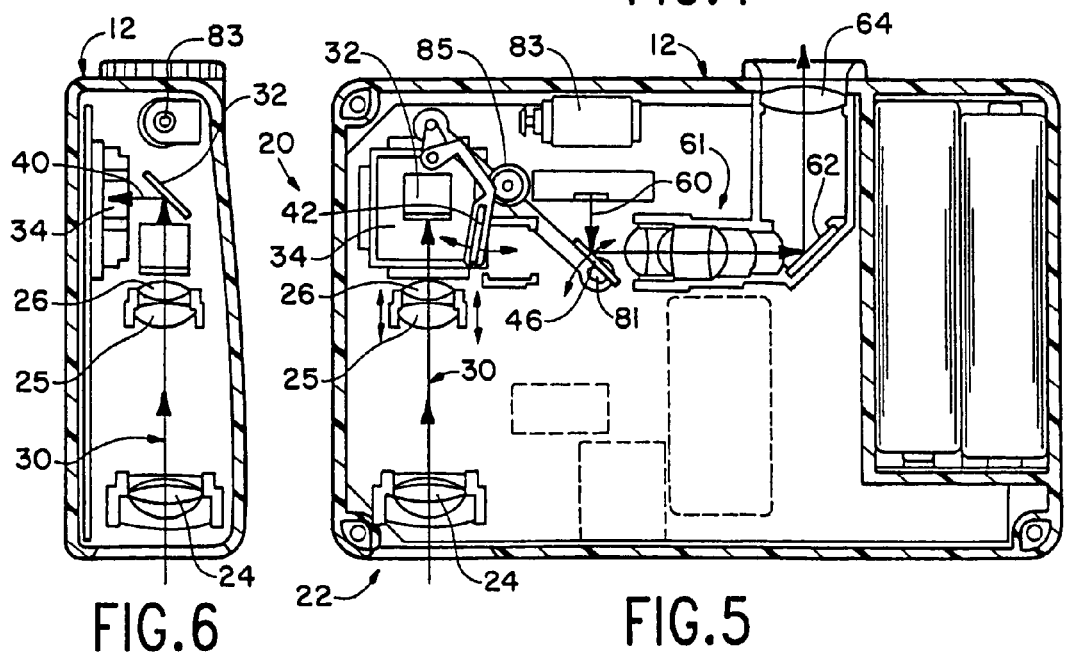

METHOD OF AUTOMATICALLY ADJUSTING EXPOSURE IN A SHUTTERLESS DIGITAL CAMERA

This application is a Continuation Application of U.S. patent application Ser. No. 09/428,877, filed Oct. 28, 1999, now U.S. Pat. No. 6,734,913.

TECHNICAL FIELD

The present invention relates to a digital photography system and method of using the system to provide electronic still photographs. The invention more particularly relates to a shutterless single lens digital still camera and method of automatically adjusting the exposure of the camera in high and low ambient lighting conditions.

BACKGROUND OF THE INVENTION

With the advent of small low cost digital storage devices, digital still cameras are rapidly replacing silver halide film cameras as the camera of choice. In this regard, such low cost digital storage devices are enabling digital cameras to provide high resolution electronic still photographs. Moreover, with the current improvements in ink jet and laser printer technologies, inks, paper, and image reproduction processes are allowing color prints to be generated from captured digital images that are of substantially the same quality as that provided through silver halide color prints.

While digital still cameras have been replacing silver halide color print cameras as the preferred choice of the consumer, one of the biggest drawbacks with most, if not all digital cameras, has been size. That is, in order for a user to capture and review an electronic still image such digital devices have incorporated large, bulky and expensive liquid crystal display units and other light converting devices, such as charge coupled devices and the like. More particularly, in order for a user to preview an image to captured, the digital camera must give feedback to a user of what area of a scene to be photographed will be captured when a picture is taken. This has traditionally been accomplished using a built-in device called an optical viewfinder or optical window that enables the user to visualize the scene and see exactly what area of the scene that will be captured by the camera lens system. The ability of providing an accurate representation of the image to be capture has been implemented in two different manners between what is known in the state of the art as a through the lens (TTL) camera and a point and shoot (PAS) camera.

In the TTL camera, as a user views a scene to be photographed, he or she utilizes the camera viewfinder. More particularly, the user is viewing the scene through the lens system of the camera. That is, with the help of an internally positioned mirror within the TTL camera, the light passing through the lens system is reflected by the internal mirror and directed to the optical viewfinder for consideration by the user. When the user is satisfied with the scene to be captured, the mirror is repositioned allowing a direct light path to the photosensitive plane of the camera, and thus, allowing the scene to be captured as viewed through the optical viewfinder.

The PAS camera is much less expensive and does not allow the user to view the scene through the primary lens system. Instead, the optical viewfinder is provided with a secondary lens system that moves in and out in tandem with the primary lens system. In short then, in the PAS camera two separate light paths are established; one light path for the primary lens system to the photosensitive plane of the camera and another light path through the secondary lens system to the viewfinder for the scene preview benefit of the user.

In either implementation whether TTL or PAS, once the user has captured the image, the user can then only view the captured image by switching the camera mode of operation from a preview mode of operation to a review mode of operation. The change in the mode of operation permits the user to view the previously stored captured images on a liquid crystal display panel of the camera Therefore it would be highly desirable to have a new and improved digital camera that would permit the user to immediately view a captured image without switching the mode of camera operation and without the need of viewing the image on an externally mounted liquid crystal display device.

SUMMARY OF THE INVENTION

In accordance with the present invention, a shutterless single lens digital still camera includes an internal processor and auto exposure algorithm that automatically adjusts the exposure of the camera in high and low ambient lighting conditions. The auto exposure algorithm causes the camera to generate a signature of a current ambient luminance level and then in response to the signature to generate automatically an exposure setting.

BRIEF DESCRIPTION OF DRAWINGS

The above-mentioned features of this invention and the manner of attaining them will become apparent, and the invention itself will be best understood by reference to the following description of the embodiment of the invention in conjunction with the accompanying drawings wherein:

FIG. 2 is a diagrammatic top plane view of the camera of FIG. 1, illustrating a through the lens optical path for previewing an image to be captured;

FIG. 3 is a diagrammatic side plane view of the camera of FIG. 1, illustrating a through the mirror optical path for facilitating the automatic setting of camera operating conditions;

FIG. 4 is a front plane view of the camera of FIG. 1;

FIG. 5 is another diagrammatic top plane view of the camera of FIG. 1, illustrating another optical path for facilitating the viewing of a captured digital image;

FIG. 6 is another diagrammatic side plan view of the camera of FIG. 1, illustrating another through the lens optical path for capturing an object image;

BEST MODE FOR CARRYING OUT THE INVENTION

Figure 1:
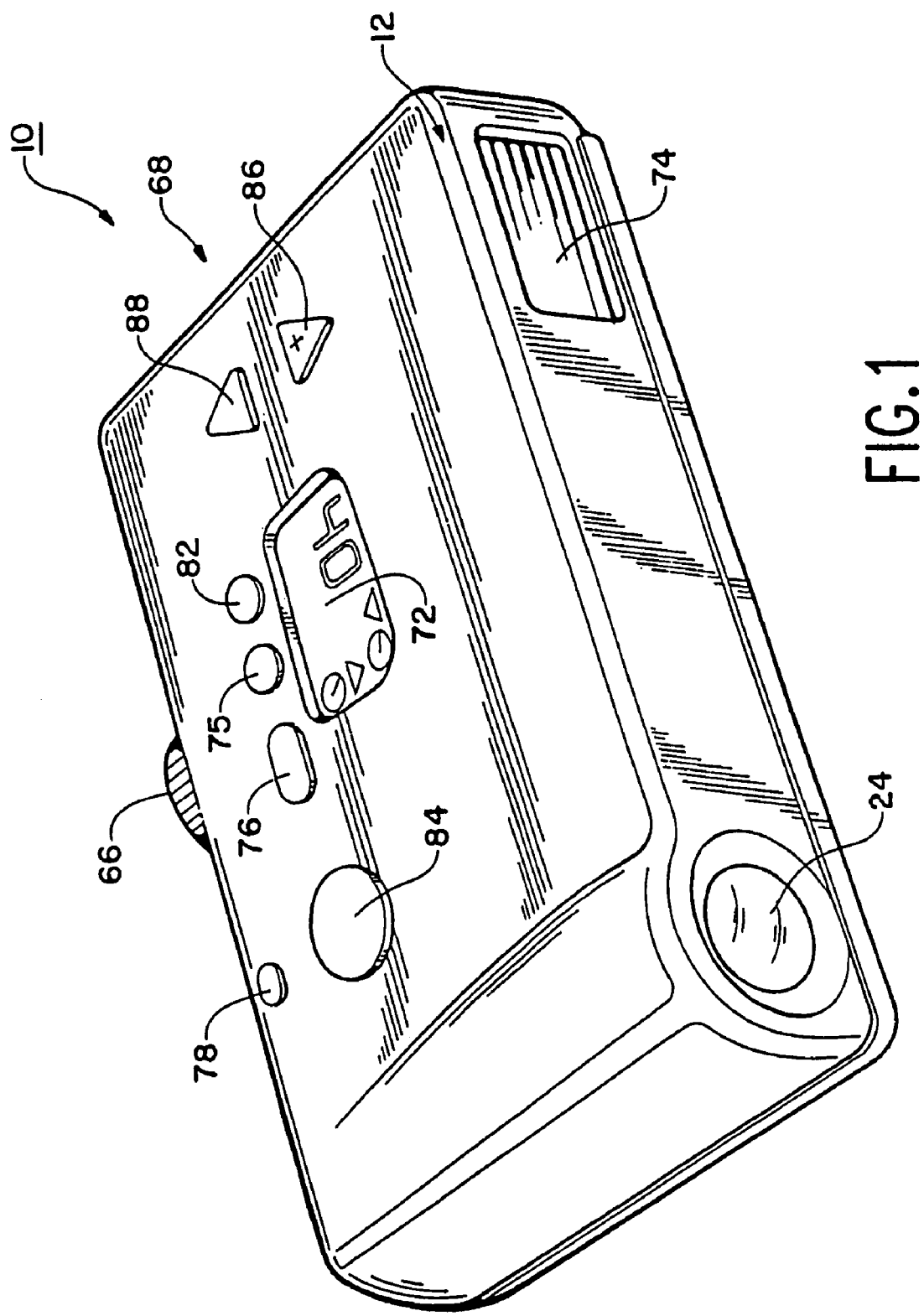
FIG. 1 is a pictorial view of a shutterless digital camera which is constructed in accordance with the present invention.

Referring now to the drawings, and more particularly to FIG. 1 thereof, there is shown a low-profile, pocket-size shutterless digital camera 10 which is constructed in accordance with the present invention. The digital camera 10 is capable of capturing and transmitting desired ones of a plurality of stored digital still images without the use of an externally visible display device.

Considering now the digital camera 10 in greater detail with reference to FIGS. 1-6, the digital camera 10 generally includes a low profile compact housing 12 that is sufficiently small to fit within a shirt or blouse pocket of a user (not shown). The housing 12 is generally rectangular in shape having disposed therein an operating system compartment 14 and a power supply or battery compartment 16. The operating system compartment 14 encloses and supports the operative components of the camera 10 in a conventional manner, while the battery compartment 16 encloses and supports a pair of rechargeable batteries 18 and 19 for providing the camera components with the necessary electrical energy to facilitate normal camera operations.

Figure 7:
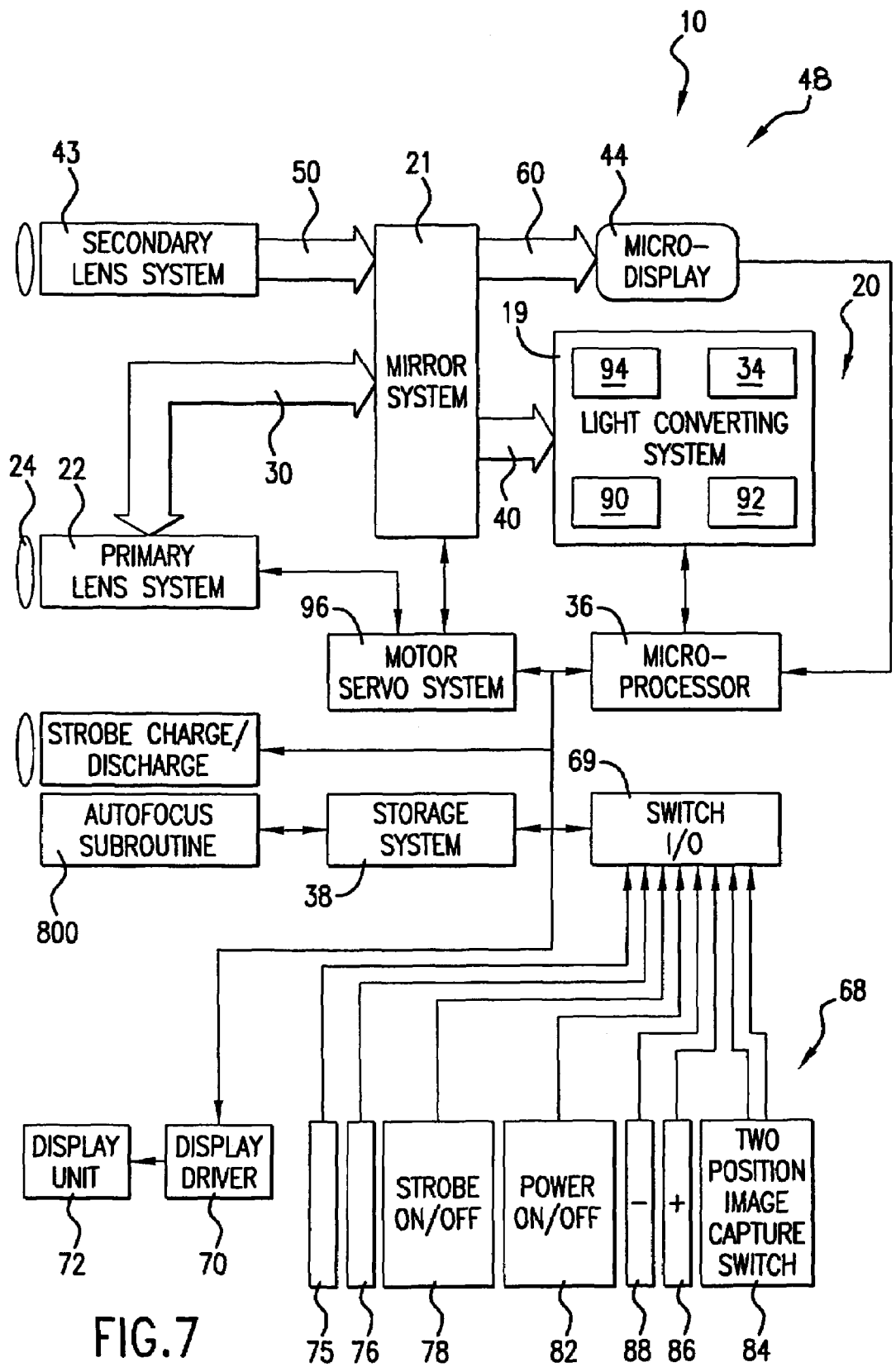
FIG. 7 is a block diagram of the operating components of the shutterless digital camera of FIG. 1.

In order to capture a desired object image or scene, the camera 10 includes a shutterless image capture system 20 and a primary lens system 22 that is at least partially disposed in a primary light path 30 within the operating system compartment 14. A micro processor controlled mirror system 21, as best seen in FIG. 7, directs light along a plurality of different light paths within the camera 10 to facilitate both image capture, via an image sensor 34 and image review, via an internally mounted micro display 44 during the same camera operation as will be explained hereinafter in greater detail.

As best seen in FIG. 3, the primary lens system 22 includes a primary lens 24 mounted at about a forward sidewall of the housing 12 and a pair of internally mounted movable focusing lens 25 and 26 respectively. The focusing lens 25 and 26 are independently moveable along a portion of the primary light path 30 to cooperate with the primary lens 24 for helping to automatically focus light reflecting from an object into the image sensor 34 forming part of the shutterless image capture system 20. A fixedly mounted mirror 32 disposed in the primary light path 30 directs light traveling along the primary light path 30 downwardly along an image capture path 40 into the image sensor 34. In the preferred embodiment of the present invention, the image sensor 34 is a CMOS sensor. It will be understood however, by those skilled in the art that other types and kinds of image sensors, such as a charge coupled device, can also be utilized for light converting purposes.

The shutterless image capture system 20 also includes a microprocessor 36 having coupled thereto the image sensor 34, and a high density storage device 38. The micro processor 36 under the control of an image capture algorithm 600 and an automatic focus algorithm 800 control the mirror system 21 and the focusing lens 25 and 26 to provide a user of the camera 10 with clear sharp optical and digital images as will be explained hereinafter in greater detail. As mentioned earlier, the image sensor 34 is preferably in the form of a CMOS device, for converting light traveling along the image capture path 40 into an electrical signal indicative of the object image.

Considering now the mirror system 21 in greater detail with reference to FIGS. 2 and 5, the mirror system 21 generally includes a pivotally mounted partially reflective, partially transmissive mirror 42 that is mounted in the primary light path 30 between the image sensor 34 and the focusing lens 25 and 26. The mirror 42 attenuates the light traveling to the image sensor 34 to prevent over driving the image sensor 34 for image capture purposes but does not sufficiently attenuate the light traveling to the image sensor 34 to prevent the automatic adjustment of exposure settings for current ambient light conditions via an auto exposure subroutine 700. In this regard, if the ambient light conditions are insufficient to activate the automatic exposure feature of the camera 10, the microprocessor 36 will cause the mirror 42 to be pivoted out of the primary light path 30 allowing the light traveling along the image capture path 40 to reach the image sensor 34 without the light being attenuated. More particularly, the microprocessor 36 under the control of the automatic exposure algorithm 700 adjusts the exposure settings for the camera 10 and then, either before or after deflecting the mirror 42 from the primary light path 30 permits the image sensor 34 to capture the desired object image. In this regard, the camera 10 is a true shutterless camera as the light sensitive sensor 34 is always receiving light through the primary lens system 22.

The digital camera 10 further comprises an optical viewfinder system 48 (FIG. 7) that includes a micro display 44 and a secondary lens system 43 for gathering and focusing light emanating from the object to be captured or from the digital image of the captured object via the micro display 44. A path selecting mirror 46 forming part of the mirror system 21, is mounted in a through-the-lens light path 50 for either independent or simultaneous movement with the partially reflective partially transmissive mirror 42. In this regard, the path selecting mirror 46 is mounted within the operating system compartment 14 in the through-the-lens light path 50 that intercepts the light traveling along the primary light path 30 after the light has been deflected into the through-the-lens light path 50 via the partially reflective partially transmissive mirror 42. The mirrors 42 and 46 operate under the control of the microprocessor 36 to permit a user to either preview an object image to be captured via the through-the-lens light path 50 or review a captured object image via a review light path 60. In short then, the optical viewfinder system 48 under the control of the microprocessor 36 selectively permits a user to visualize either an object or scene to be captured or alternatively, once an object image or scene is captured, to visualize the captured object or scene through the viewfinder system 48 without the use of an externally visible display device.

In order to permit the user to focus the camera 10 for the eye of the user relative to previewing and reviewing an object image, the secondary lens system 43 includes a secondary set of lenses, indicated generally at 61 and a redirecting mirror 62 for causing light from the object image or the micro display 44 to be focused into a housing mounted diopter 64 having a rim adjustor 66. The rim adjustor 66 rotates under the control of the user to change or adjusts the focus of the optical viewfinder system 48 so that either a captured image displayed on the micro display 44 or a through-the-lens object image being previewed prior to capture appears "in focus" to the eye of the user.

The camera 10 also includes a strobe flash, indicated generally at 74, to facilitate illuminating an object image under low ambient light conditions. The strobe flash 74 responds to a flash on/off signal coupled from a flash on/off switch 78 forming part of a group 68 of external control switches.

As best seen in FIG. 2, the camera 10 further includes a universal system bus (USB) or jack 28 that is disposed in a jack compartment 15 located adjacent to the battery compartment 16. The jack compartment 15 is accessible via a jack compartment door 54 that is mounted to the camera housing 12 by a set of internal hinge members 56 and 58 respectively. The internal hinge members 56 and 58 are disposed in such a manner to permit the jack compartment door 54 to freely open without displacing the camera housing 12 from a normally horizontal plane orientation when the underside or bottom of the camera 10 is resting on a supporting surface.

The digital camera 10 also includes a user interface arrangement 67 that includes the group 68 of external control switches and a status display unit 72 in the form of a flat panel liquid crystal display. The group 68 of control switches are coupled to the microprocessor 36 via a switch input/output buffering device 69 (FIG. 7) and input/output bus indicated generally at 80.

As best seen in FIG. 1, the status display 72, and the group 68 of switches, are housing mounted for easy viewing and manipulation by a user. In this regard, the user interface arrangement 67 helps a user to control camera operations in a fast and convenient manner using a graphical user interface generated by the micro processor 36 and a control program 100 that includes the capture image algorithm 700. The control program 100 as will be explained hereinafter in greater detail, controls camera operations including power on/off, menu selections, flash on/off, zoom in, zoom out, scroll forward, scroll backward and set self time mode. It should be noted that the status display unit 72 mounted in a top side of the camera 10 for external viewing by the user, permits the user to view alphanumeric and graphical information only. In this regard, the status display unit 72 does not display either object images to be captured or captured object images. Instead the status display unit 72 is only utilized too provide the user with a visual indication of various ones of the camera operating conditions, such as for example, a camera power on/off indication or a flash mode selected indication.

A complete list of the user interface control switches and their associated functions are provided in Table 1.

TABLE 1

| Manually Operable Switch | Function |
| --- | --- |
| Power On/Power Off | Pushbutton 82 to power camera 10 On and Off. |
| Capture Object Image | A two-position pushbutton 84 to capture an object image. |
| Scroll Up/Zoom Out | Pushbutton 86 operates to scroll up through a group of captured images or through a menu selection displayed on the micro display 52 when the camera 10 is operated in a menu mode. When the camera 10 is operating in a capture image mode, pushbutton 86 functions as a zoom out switch while depressed. |
| Scroll Down/Zoom In | Pushbutton 88 operates to scroll down through a group of captured images or through a menu selection displayed on the micro display 52 when the camera 10 is operated in a menu mode. When the camera 10 is operating in a capture image mode, pushbutton 88 functions as a zoom in switch while depressed. |
| Strobe Flash On/Off | Pushbutton 78 to turn a strobe flash 74 to a desired On or Off mode, an automatic mode, a red eye AUTO mode, or a red eye On mode, where the mode selected is displayed on the status display unit 72. |
| Menu/Image Mode | Pushbutton 76 to cause the micro display 52 to display menu selections. |
| Image Mode | Pushbutton 75 to display captured images when the capture object image pushbutton 84 is activated and view preview object images when the capture object image pushbutton 84 is not activated. |

Considering now the operation of the camera 10 in greater detail with reference to FIGS. 1-6, when a user desires to capture a desired object or scene as a digital still image, the user activates the camera 10 by depressing the power on/off pushbutton 82. To verify that the camera 10 is activated the user views the status display 72 for such a power on indication.

Next the user activates the menu/image mode switch 76 to place the camera in the image mode of operation. The user may verify this mode of operation by looking through the diaopter 64 to verify through-the-lens operation. That is, the user will be able to see an object or scene to be captured through the viewfinder system 48 via the diopter 64.

The user next points the camera 10 at the object to be captured and depresses the capture image pushbutton 84 half way or to a first stop position. The microprocessor 36 responds to the activation of pushbutton 84 by executing two algorithms: the auto exposure algorithm 700 and an auto focus algorithm 800, which algorithms will be described hereinafter in greater detail. At this point, it will be sufficient to indicate that the execution of the algorithms 700 and 800 cause the exposure and focus of the camera 10 to be automatically set or adjusted.

Next the user may desire to change the image to be captured by zooming the camera 10 in or out using the pushbuttons 86 and 88 respectively. In this regard, the user releases the capture object image switch 84 and activates either pushbutton 86 or pushbutton 88 to acquire a desired image to be captured. When the user is satisfied with the image to be captured as viewed via the diopter 64, the user once again depresses the capture object image switch 84 to the first stop position permitting the camera 10 to set the focus and exposure settings for the camera 10. If the user is satisfied with the image to be captured, the user simply depresses the capture image pushbutton 84 to its frilly depressed or second stop position.

When pushbutton 84 is fully activated, the microprocessor 36 executes a capture image algorithm 600 that will be described hereinafter in greater detail. In short however, the algorithm 600 causes the pivotally mounted mirror 42 to pivot or swing out of the primary light path 30, permitting light entering through the primary lens system 22 to be focused onto the image sensor 34. The user is able to verify the capture operation since the path selection mirror 46 simultaneously swings or pivots blocking the through-the-lens path 50 and establishing the light path from the diaopter 64 to the micro display 44 via the review light path 60. In this regard, the object or scene previously saw by the user switches temporarily to a black image.

The microprocessor 36 then causes the CMOS image sensor device 34 to convert the light focused from the primary lens system 22 into an electrical signal indicative of the captured object or scene. Once the image has been captured via the image sensor 34, the micro processor 36 causes the captured image to be stored in the storage device 38 in a compressed image format, just as in a JPEG image format.

When the captured image is stored in the storage device 38, the microprocessor 36 causes the captured image to be accessed from the storage device 38 and displayed on the micro display 44. In this regard, the black image being viewed by the user switches to the captured image. In short then, the user is able to immediately view the image captured to determine whether a desired image was in fact captured. The user then releases the capture object image pushbutton 84.

Upon releasing the captured image pushbutton 84, the micro processor 36 under control of the capture image algorithm 600, causes the mirrors 42 and 46 to swing or pivot back to their original positions once again permitting the user to view an object of scene to be capture via the through the lens light path 50. The above described image capture process is then repeated a desired number of times or until the storage device 38 is full whichever occurs sooner.

Considering now the camera 10 in still greater detail with reference to FIG. 7, when the user depresses the capture object image switch 84 to the first stop position, the microprocessor 36 under control of the auto exposure algorithm 700 determines a proper exposure setting for the image sensor 34. More particularly, when the micro processor 36 receives an adjust focus signal from the image capture switch 84 being depressed to the first stop position, the microprocessor 36 during a first sampling period $T_1$ samples the ambient light output signal from the image sensor 34. The sampling period $T_1$ is a short sampling period as there is no need to sample the entire image to be captured. Instead, the algorithm 700 is only interested in sampling the intensity of the light entering the camera 10 via the primary light path 30 and as attenuated by the mirror 42 before reaching the image sensor 34 via the fixed mirror 32 and image capture path 40.

The microprocessor 36 responds to the ambient light output signal from the image sensor 34 by subdividing the signal into a series of smaller samples that are then arranged in a desired order, such as a matrix arrangement, strip of contiguous sample areas, or a set of overlapping sample areas. In this regard, a binary one is established for a given area if its gray level equals or exceeds a predetermined luminance level of about N % and a binary zero is established for a given area if its gray level is less that the predetermined luminance level of about N %. The number N is between about 10 and about 30 for most exposures settings. A more preferred number N is between about 15 and about 25, and the most preferred number N is about 18. The binary values derived from the individual image areas or sets of image areas are then utilized to form a pointer that locates a corresponding exposure setting or level to be applied to the image sensor 34 of the camera.

If the ambient light output signal from the image sensor 34 does not exceed a given threshold level, the microprocessor 36 causes the mirror 42 to pivot out of the primary light path 30 allowing light entering the primary lens system 22 to be directly focused on the image sensor 34 without being attenuated. The steps of subdividing, assigning, and forming are repeated to locate another corresponding exposure setting or level to be applied to change the gain settings of the image sensor 34 to achieve a desire exposure level.

Considering now the camera 10 in still greater detail with reference to FIG. 7, when the user depresses the capture object image switch 84 to the first stop position, the microprocessor 36 under control of the auto focus algorithm 800 determines a proper focus setting for the primary lens system 22. More particularly, when the micro processor 36 receives an adjust focus signal from the image capture switch 84 being depressed to the first stop position, the microprocessor 36 during a first sampling period $T_1$ moves the focus lens 26 from an initial hyperfocal position to a full range focusing position. While the focusing lens 26 is moving, the auto focus algorithm 800 causes the micro processor 36 to capture and temporarily store a series of output signals from the image sensor 34.

At the end of the sampling period $T_1$ the micro processor 36 under control of the auto focus algorithm 800 causes the focusing lens 26 to return to its initial hyperfocal position during another sampling period $T_2$. During the sampling period $T_2$, the microprocessor 36 under control of the auto focus algorithm 800 determines which one of the captured and stored image signals is the best focused image. This is accomplished by taking the derivative of a plurality of lines of pixels in each image, and weighting the center more heavily than the periphery. The image with the greatest absolute value of derivative is determined to be the image in the clearest focus.

If a best focused image is determined during the time period $T_2$, the microprocessor 36 under control of the auto focus algorithm 800 causes the focus lens 26 to move to the best focused position during another time period $T_3$. If the auto focus algorithm 800 did not determine a best focused position during the time period $T_2$, the microprocessor 36 causes the focus lens 26 to remain in the hyperfocal position.

The auto focus position determined by the auto focus algorithm 800 will remain set in the camera 10 if the user fully activates the capture object image switch 84 within a predetermined time period $T_4$ from the end of time period $T_3$. Stated otherwise, the auto focus feature is disabled and the primary lens system remains set in the last focus position determined by the auto focus algorithm 800.

If the user fails to fully activate the capture object image switch 84 within the predetermined time period $T_4$ from the end of time period $T_3$, the auto focus feature is once again activated and proceeds as described.

Considering now the viewfinder system 48 in greater detail with reference to FIGS. 2 and 5, the mirror system 21 includes a support arm 81 mounted for pivot movement within the housing 12. The support arm 81 is coupled to a motor 83 forming part of a motor servo system 96 that is responsive to the microprocessor 36. The motor servo system 96 and more particularly the motor 83 is also coupled the focusing lens 25 and 26 respectively to facilitate their movement along the primary light path 30 for image focusing purposes. The support arm 81 has mounted at its distal end the path selecting mirror 46. In this regard, when the support arm 81 pivots about its longitudinal axis, the path selecting mirror 46 is pivotally moved into the through-the-lens light path 50. When the path selecting mirror 46 is so positioned, the viewfinder system 48 is blocked from observing the light traveling along the primary light path 30. The path selecting mirror 46 is also so positioned to permit the viewfinder system 48 to observe light originating from the micro display 44.

Considering now the image capture system 20 in greater detail with reference to FIGS. 2, 5 and 7, the image capture system 20 permits a user to immediately review a captured image once the image has been stored in the storage device 38. In this regard, the image sensor 34 converts light into an electrical signal in the form of a digital signal output that is buffered to the micro processor 36 from a buffer memory 90 for storage in the storage device 38. The buffer memory 90 forms part of a light converting system 19 that also includes a timing generator 92 and gain control circuit 94 to help facilitate the auto focus, auto exposure and image capture features of the camera 10.

The image capture system 20 also includes a pivotally mounted mechanical linkage 85 that is coupled to the motor 83. The support arm 81 has mounted at its distal end the partially reflective partially transmissive mirror. In this regard, when the mechanical linkage 85 pivots from a blocking position to an open position, the mirror 42 is moved into the through-the-lens light path 50 blocking the viewfinder system 48 and sufficiently opening the primary light path 30 to permit light to reach the deflection mirror 32 without being attenuated. In the preferred mode of operation the mirror 42 and the mirror 46 move simultaneously. However it should be understood by those skilled in the art that the mirrors 42 and 46 can be moved independently of one another to accomplish the same result. Thus for example, under low ambient light conditions when the user depresses the image capture pushbutton 84 to a half way position, the mirrors 42 and 46 remain stationary while the auto exposure and auto focus algorithms 700 and 800 are executed by the microprocessor 36. In this regard, if there was insufficient ambient light the capture image routine 600 may delay the moving of the path selecting mirror 46 when the user fully depresses the pushbutton 84. In this situation, the capture image routine 600 first causes the mirror 42 to be moved into the through-the-lens path 50 allowing the auto exposure algorithm 700 to adjust the exposure setting of the camera prior to capturing the object image. Once the auto exposure subroutine 700 is executed, the capture image routine 600 proceeds by capturing the image and moving the path selecting mirror 46 to permit the user, via the viewfinder system 48, to observe light originating from the micro display 44. In this example therefore, the mirrors 42 and 46 move independently of one another and not simultaneously as described in the preferred embodiment of the present invention.

Figure 8:
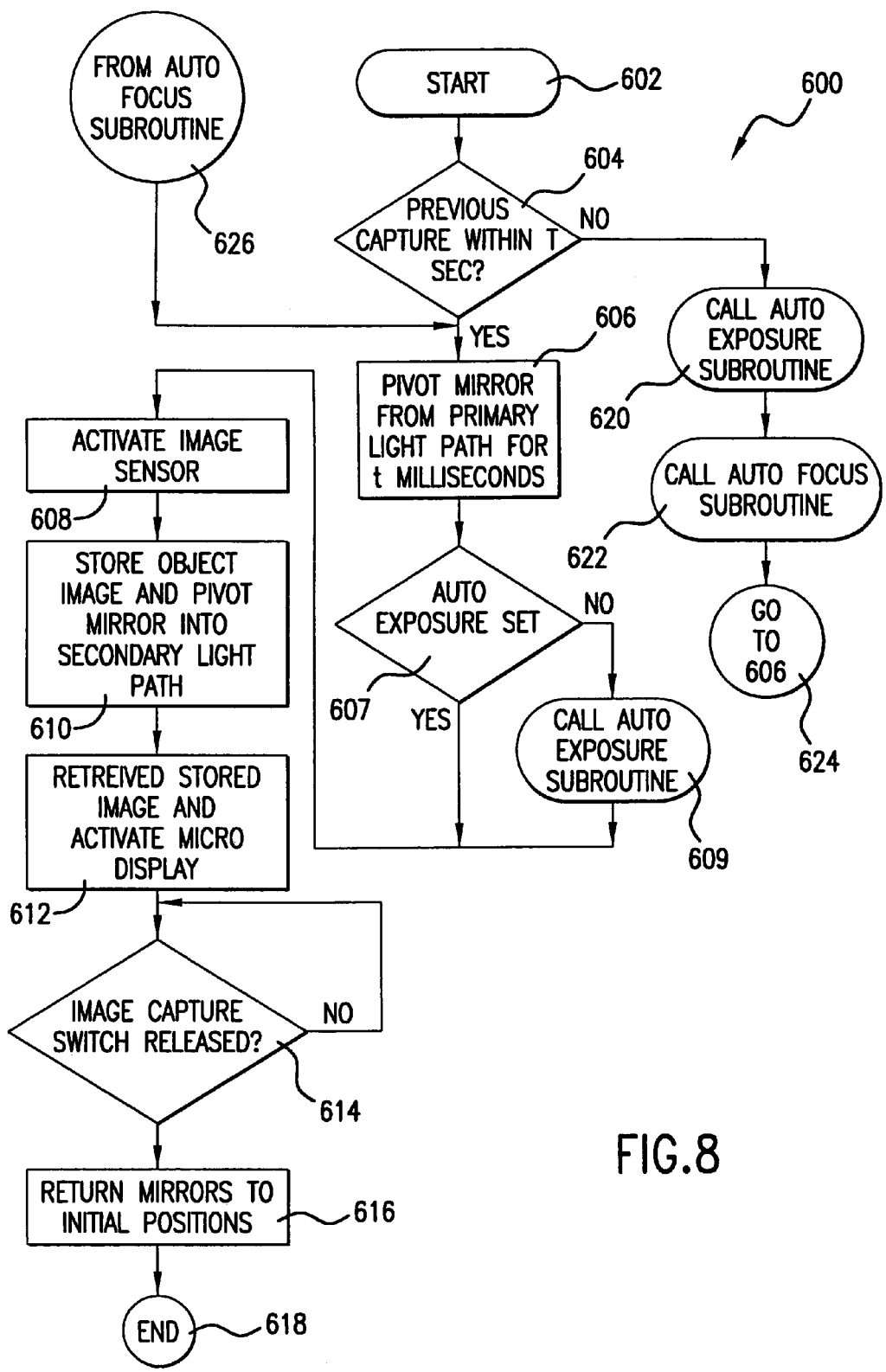
FIG. 8 is a high level flow chart illustrating control program steps for capturing an object image with the camera of FIG. 1.

Considering now the capture image routine 600 in greater detail with reference to FIG. 8, the capture image routine 600 begins at a start command 602 that is initiated whenever the user depresses the image capture switch 84 to a half way position. Upon detection of the activation of the image capture switch 84, the capture image routine 600 advances to a decision step 604 to determine whether the user has depressed the image capture switch 84 to a fully depressed position within T seconds of the last time the switch 84 was fully depressed. In this regard, if the switch 84 has not been fully depressed the routine 600 proceeds to a call command 620 that calls the AUTO EXPOSURE subroutine 700. The auto exposure subroutine 700 will be described hereinafter in greater detail.

After the exposure subroutine 700 has been executed at the call step 620, the program advances to a call step 622 that calls an AUTO-FOCUS subroutine 800. The AUTO-FOCUS subroutine 800 will be described hereinafter in greater detail. Once the AUTO-FOCUS subroutine 800 has been executed the program proceeds to a go to command 624 that causes the program to go to a command step 606.

Considering again the decision step 604, if a determination is made at the decision step 604 that the image capture switch 84 had previously been fully depressed within T seconds, the image capture routine 600 proceeds to the command step 606 that causes the partially reflective partially transmissive mirror 42 to be pivoted out of the primary light path for t milliseconds. The time period t milliseconds is a sufficient period of time to permit the image sensor 34 to capture the light indicative of an object image and to convert the captured light into an electrical signal indicative of the object image. In this regard, when the mirror 42 is pivoted out the primary light path and into the secondary light path blocking the user from seeing the object image passing through the primary lens.

Next, the routine 600 proceeds to a decision step 607 to determine whether the exposure of the camera 10 was set when the auto exposure subroutine 700 was previously executed. If the exposure of the camera was not previously set when the mirror 42 was disposed in the primary light path 30, the routine 600 proceeds to the call command 609 that calls the auto exposure subroutine 700. When the auto exposure subroutine 700 has been successfully executed, the subroutine 700 exists to a command step 608.

Considering again the decision step 607, if the exposure of the camera 10 was previously set when the mirror 42 was disposed in the primary light path 30, the routine 600 proceeds directly to the command step 608 without calling the auto exposure subroutine 700 as previously described. Command step 608, causes the image sensor 34 to be activated for a sufficient period of time to convert the light reflecting from the object image into a binary electrical signal. Once the binary signal indicative of the object image has been generated by the image sensor 34, the routine 600 proceeds to a command step 610 that causes the binary signal to be stored in the storage system 38. The command 610 also causes the path selecting mirror 46 to be pivoted into the through the lens or secondary light path 50 to permit the user to view the screen of the micro display 44.

When the path selecting mirror 46 has been pivoted into the secondary light path 50, the routine 600 causes proceeds to a command step 612 that causes the object image immediately stored in the storage system 38 to be retrieved and transferred to the micro display unit 44. In this manner the user is able to immediately view the captured object image without changing the operating mode of the camera from a preview mode to a review mode.

Next, the routine 600 proceeds to a decision step 614 to determine whether the user has released the image capture switch 84. If the user has not released the capture switch 84, the program will wait at the decision step 614 until the switch 84 is released. When the switch 84 is released, the routine advances to a command step 616 that causes the mirrors 42 and 46 to be returned to their initial positions. Also at the command step 616 a program timer is activated to facilitate determining whether the auto exposure and auto focus algorithms 700 and 800 need to be executed again as previously described with reference to the decision step 604. Once the program timer has been set, the control program 600 proceeds to an end command 618 to exit the routine 600 and wait for the user to once again activate the capture image switch 84.

Figure 10:
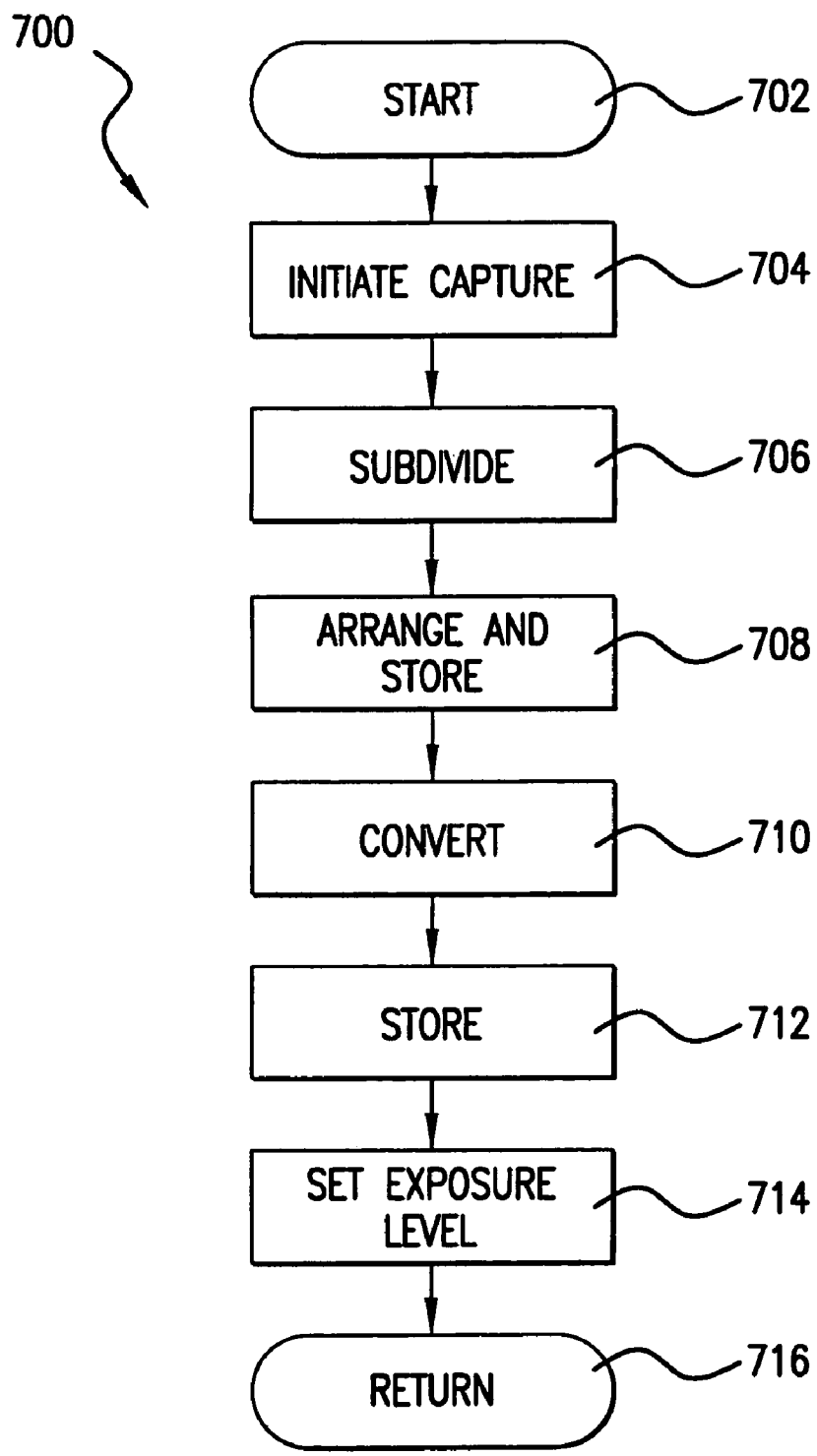
FIG. 10 is a high level flow chart illustrating control program steps for automatically adjusting the exposure level of the camera of FIG. 1.

Considering now the auto exposure algorithm 700 in greater detail with reference to FIG. 10, when the auto exposure algorithm 700 is called from step 620 (FIG. 6) the auto exposure subroutine advances from a start command 702 to an initiate capture command 704. The initiate capture command enables the image sensor 34 to generate a exposure calibration signal indicative of the ambient light conditions seen through the primary lens 24. In this regard, the signal generated by the image sensor 34 is indicative only of a portion of the entire image seen through the primary lens 34.

The subroutine then advances to a subdivide command 706 that causes the exposure calibration signal to be subdivided in a plurality of gray level segments. As each segment is formed, the resulting segment is stored via an arrange and store command 708. In this regard, the segments may be stored in a matrix arrangement, a strip of contiguous segments, or as sets of overlapping segments.

The subroutine then proceeds to a convert command 710 that retrieves each segment and assigns each retrieved segment a binary value. A binary one is established for a given segment if its gray level value exceeds a predetermined luminance level of about eighteen percent. If the given segment does not exceed the about eighteen percent threshold value, the segment is assigned a binary zero value. The assigning of binary values continues until all segments in the arrangement have been assigned a one or zero value. The assigned values are stored via a store command 712 and are subsequently utilized as a pointer. The subroutine then advances to a set exposure level command 714 where the microprocessor 36 retrieves an exposure value that corresponds to a desired exposure setting based on the determined pointer value. The retrieved exposure value is applied to the camera 10. The subroutine then goes to a return command 716 that returns control to the main program at the call command 622 (FIG. 6).

Figure 9:
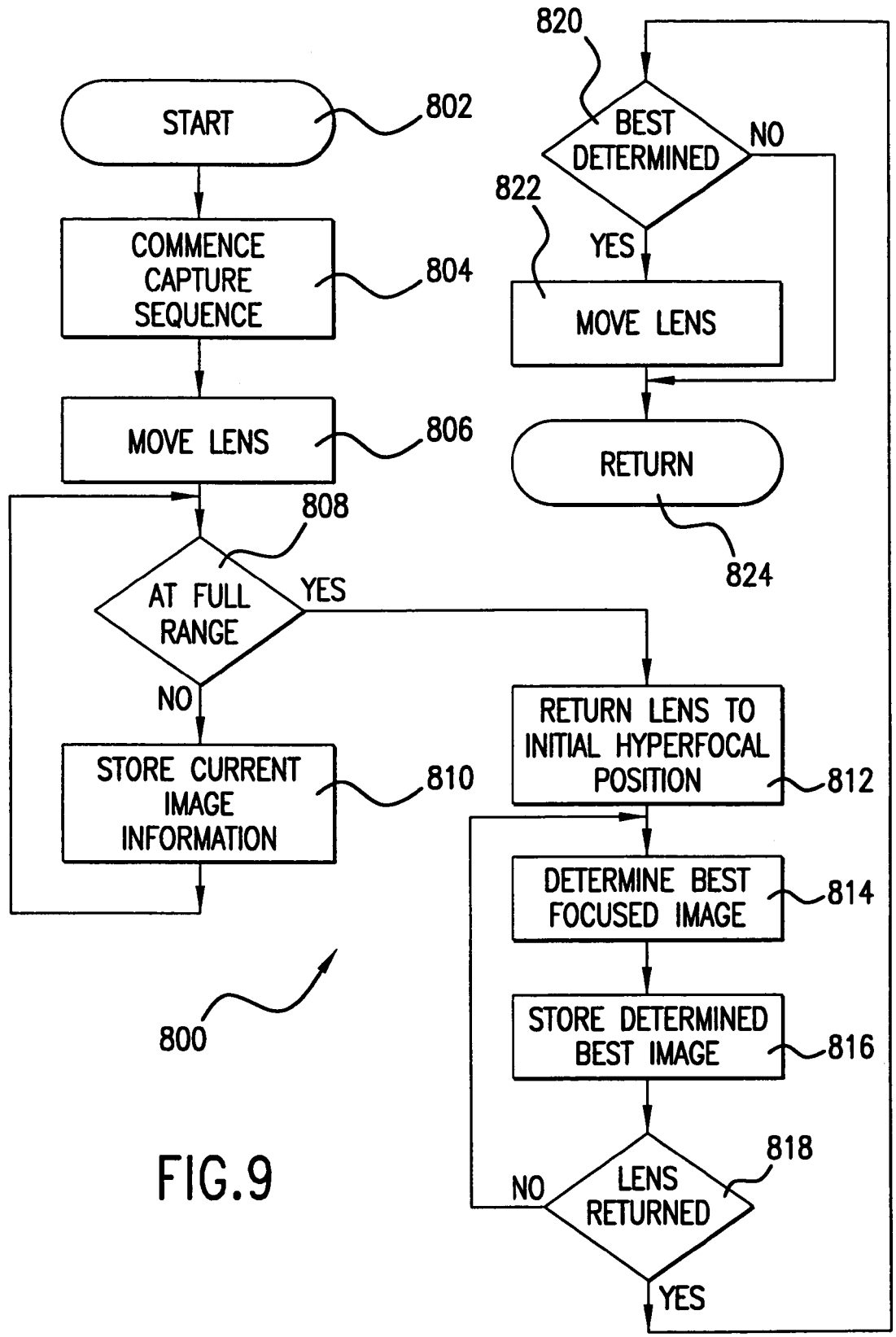
FIG. 9 is a high level flow chart illustrating control program steps for automatically setting the focus of the camera of FIG. 1.

Considering now the auto focus algorithm 800 in still greater detail with reference to FIG. 9, when the auto focus subroutine 800 is called from step 622 (FIG. 6) the auto focus subroutine advances from a start command 802 to an initiate capture sequence command 804. The initiate capture sequence command 804 causes a sampling period of $T_1$ seconds to be subdivide into a plurality of $t_1$ sampling periods, to cause a sequence of images to be captured. In this regard, one image will be captured and temporarily stored at each $t_1$ occurrence. The algorithm then advances to a command step 806 that causes the primary camera lens to move from an initial hyperfocal position to a full range focusing position during the sampling period $T_1$. From the foregoing it should be understood by those skilled in the art that as the primary lens system is moving over its full focusing range a series of images with different focus characteristics are being captured.

The subroutine then proceeds to a determination step 808 to determine whether the primary lens system has advanced through its full focus range. If the lens has not been moved through its full range the subroutine advances to a command step 810 that causes a current image as viewed through the primary lens to be temporarily stored. The subroutine then returns to the determination step 808. From the foregoing it should be understood by those skilled in the art that as the primary lens system is moving over its full focusing range, different ones of the images captured are being temporarily stored.

Once a determination is made that the primary lens has moved over its full range of motion, the subroutine advances from determination step 808 to a return lens command 812. The return lens command 812 causes the primary lens to be returned to its initial hyperfocal position.

After the return command 812 has been executed the subroutine advances to a calculate command 814 that calculates a focus factor for each of the temporarily stored images in order to determine which one of the captured image has the best focus factor. In this regard, the subroutine advances to a store command 816 that causes a current focus factor to be stored if it is indicative of a better focused image then that of a previously stored image. The subroutine then goes to a determination step 818 to determine whether the primary lens has returned to its initial hyperfocal position.

If the primary lens has not returned to its initial hyperfocal position, the subroutine returns to the calculate step 814 and proceeds as described previously. If the primary lens has returned to its initial hyperfocal position, the subroutine advances to a determination step 820 to determine whether a best focused position has been determined. If a best focused position has not been determined, the program advance to a return step 824 that returns the subroutine to the main control program at the go to step 624 (FIG. 8). If a best focused position has been determined, the program advances to a move lens command 822 that causes the primary lens to move to its best focused position. Once the lens has been moved to a best focused position, the subroutine proceeds to the return step 824.

Considering now the camera 10 in still greater detail with reference to FIG. 7, the status display 72 is mounted in the top side of the camera housing 12 for viewing by the camera user. The display 72 is preferably a liquid crystal display that can display alphanumeric and graphical information. The display 72 is driven in a conventional manner by a display driver circuit 70 that will not be described hereinafter in greater detail. The display driver 70 is coupled to the microprocessor 26 via the bus 80 as best seen in FIG. 7.

The display driver 70 is also coupled to the micro display 44 on which the recorded images are displayed each time the user actuates the image capture switch 84 while the camera 10 is operated in an image capture mode of operation. The micro display 44 also displays menu information when the camera is operated in a menu mode of operation. In this regard, when the camera is operated in the menu mode of operation, the user via the scroll switches 86 and 88 can scroll through the images stored in the storage system 38 and view menu selection items for the purpose of downloading selected ones or all of the stored images via the universal system bus 26, or deleting one or all of the stored images. In short then, the micro display 44 can display a series of menus providing a plurality of command options that can be selected by the user as part of a graphical user interface (GUI) generated by the microprocessor 36 using a control program stored in the internal memory 38.

The manually actuable controls 86 and 88 may be depressed to scroll up and down through the command options displayed on the micro display 44 to provide the GUI. The pushbutton 86 when depressed in the menu mode of operation causes the micro processor 36 under the commands of the control program stored in the internal memory 38 to select command options that are highlighted on the display screen of the micro display 44.

While preferred embodiments of the present invention have been described and illustrated herein, it should be understood by those skilled in the art that the invention may be varied in both arrangement and detail. Therefore, the protection afforded the present invention should only be limited in accordance with the claims that follow.

I claim:

1. A method of automatically setting a camera exposure level, comprising:
   generating a signature of a current ambient luminance level, said signature being indicative of only a portion of an image to be captured by an image sensor; and
   generating an exposure setting in response to said signature;
   wherein said step of generating includes:
   moving a partially transmissive and partially reflective mirror into an attenuation position to lower the ambient light level entering said image sensor during a sampling period $T_1$, and moving the partially transmissive and partially reflective mirror into a non-attenuation position to allow the ambient light level to be directly focused onto said image sensor without being attenuated when the ambient light level is less than a given threshold level.

2. A method of automatically setting a camera exposure level according to claim 1, wherein said step of generating a signature of a current ambient luminance level includes:
   capturing an image indicative of said current ambient luminance level;

sub-dividing the image into a plurality of image areas;
determining for each image area whether its current ambient luminance level is about a predetermined gray level;
assigning each image area a binary value indicative of whether a current ambient luminance level associated with a individual image area is about a predetermined Grey level;
arranging the assigned binary values into a pointer; and
following said pointer to an exposure setting level appropriate for capturing an object image reflecting the current ambient luminance level.

3. A method of automatically setting a camera exposure level according to claim 2, wherein said step of generating an exposure setting, includes:
retrieving said exposure setting level; and
setting a gain level indicative of a desired exposure setting.

4. A method of automatically setting a camera exposure level according to claim 2, wherein said step of sub-dividing the image into a plurality of image areas includes:
arranging said plurality of image areas in a matrix.

* * * * *

UNITED STATES PATENT AND TRADEMARK OFFICE
CERTIFICATE OF CORRECTION

PATENT NO. : 7,304,683 B2
APPLICATION NO. : 10/783274
DATED : December 4, 2007
INVENTOR(S) : Ricardo Motta It is certified that error appears in the above-identified patent and that said Letters Patent is hereby corrected as shown below:

In column 6, line 11, delete "diaopter" and insert -- diopter --, therefor.

In column 6, line 36, delete "frilly" and insert -- fully --, therefor.

In column 6, line 47, delete "diaopter" and insert -- diopter --, therefor.

In column 8, line 65, after "mirror" insert -- 42 --.

Signed and Sealed this

Fourth Day of November, 2008

JON W. DUDAS
*Director of the United States Patent and Trademark Office*